Patented Sept. 30, 1941

2,257,190

UNITED STATES PATENT OFFICE 2,257,190

AZO DYE COMPOSITIONS

Josef Riedmair and Walter Pässler, Frankfort-on-the-Main-Fechenheim, and Gustav Torinus, Bad Soden, Germany, assignors to General Aniline & Film Corporation, New York, N. Y., a corporation of Delaware No Drawing. Application March 2, 1940, Serial No. 322,020. In Germany March 14, 1939

2 Claims. (Cl. 8—45)

Our present invention relates to a process for producing water-insoluble azodyestuffs on the fiber and to preparations for this purpose.

As is known water-insoluble azodyestuffs can be produced on the fiber by dissolving mixtures of coupling components and such diazoamino compounds as contain watersolubilizing groups in the radicle which does not take part in the dyestuff formation, in caustic alkali solutions such as a caustic soda solution, transforming these solutions, by adding thickening agents, into a form suitable for printing processes, imprinting them on the fiber and finally exposing the fiber to the action of acid vapors at elevated temperatures. By this last step the diazoamino compounds are split up and the diazo compound thus formed is combined with the coupling component.

Recently a series of new processes has been described wherein by a new constitution of the preparations used the pH value which is necessary for the processes of splitting up and combination is produced by a simple steaming process without the addition of an acid. Such processes consist substantially in incorporating in the aforesaid preparations such bases as are volatile in steam and can therefore be removed by such a step. For this purpose particularly alkyl-amines and most recently hydroxylated organic bases have been found to be suitable.

According to our invention to printing pastes, containing thickening agents and solvents, there are added (a) such mixtures of coupling components and of diazamino compounds containing acid water solubilizing groups in that part of their molecule which does not take part in the dyestuff formation, as allow the splitting off of the diazoamino compound as well as the dyestuff formation in a slightly acid to neutral medium, (b) volatile bases such as alkylamines or hydroxylated organic bases, and (c) salt solutions obtained by neutralizing the aforesaid volatile bases with a substance acting as an acid.

By this step an essential increase of the yield of dyestuff without injuring the stability of the printing pastes is obtainable. As suitable acids there may be mentioned weak inorganic acids such as phosphoric acid and organic acids such as sulfocyanic, formic, acetic, oxalic, tartaric and glycollic acid. Instead of such salts, derivatives of the acids may be used, which are easily converted into the salts in the presence of the aforesaid bases, such as tartaric acid diethylester.

In order to further illustrate our invention, the following examples are given, the parts being by weight and all temperatures in degrees centigrade.

Example 1

|  | Parts |
|---|---|
| 2-acetoacetylamino-6-ethoxy-benzthiazole | 16.1 |
| The diazoamino compound from diazotized 4-chloro-2-toluidine and the sodium salt of sarcosine | 15.3 |
| Glycol monoethyl ether | 50 |
| Diethyloxethylamine | 100 |
| An aqueous solution obtained by neutralizing 19 parts of diethyloxethylamine with formic acid | 50 |
| Water | 200 |
| A neutral starch-tragacanth thickener | 550 | are worked up in the normal manner to a printing paste, the material is printed therewith, dried at 50 to 60° and steamed for about 5 minutes in the Mather Platt, rinsed and soaped. A strong yellow print is obtained of an essentially increased tinctorial power as compared with a print prepared without the addition of the formic acid salt of diethyloxethylamine. The pastes are very stable.

Example 2

|  | Parts |
|---|---|
| 1-benzoylamino-4-benzoylacetylamino-2.5-dimethoxybenzene | 12.1 |
| The diazoamino compound from diazotized 4-chloro-2-anisidine and the sodium salt of sarcosine | 8.1 |
| Glycol-monoethyl ether | 50 |
| Dimethylaminobutanone | 120 |
| Tartaric acid diethylester | 20 |
| Water | 230 |
| A neutral starch-tragacanth thickener | 550 | are worked up in the normal manner to a printing paste and the material is printed therewith as described in Example 1. In this manner clear gold-yellow prints are obtained. The printing pastes are excellently stable.

With the same good result the tartaric acid diethylester may be replaced by the glycollic acid ester of 3-methoxy-1-butanol.

When working without such an addition the yield of dyestuff is very minor.

Example 3

| | Parts |
|---|---|
| A mixture of 2-hydroxycarbazole-3-carboxylic acid-4'-chloroanilide and the diazoamino compound from diazotized 4-chloro-2-anisidine and the sodium salt of sarcosine | 50 |
| Glycol monoethyl ether | 50 |
| Diethyloxethylamine | 100 |
| An aqueous solution obtained by neutralizing 20 parts of diethyloxethylamine with acetic acid | 50 |
| Water | 200 |
| A neutral starch-tragacanth thickener | 550 | are worked up to a printing paste and the material is printed therewith as described in Example 1. In this manner bright and strong brown prints are obtained being superior as to tinctorial power in comparison with prints produced without the addition of acetic acid diethyloxethylamine.

Example 4

With a printing paste, consisting of

| | Parts |
|---|---|
| 1-acetoacetylamino-4-chloro-2.5-dimethoxybenzene | 14.5 |
| The diazoamino compound from diazotized 5-chloro-2-toluidine and the sodium salt of methyltaurine | 16.8 |
| Glycol monoethyl ether | 50 |
| n-Propylaminoethanole | 100 |
| An aqueous solution obtained by slightly warming 20 parts of N-propylaminoethanol with an aqueous solution of 14.8 parts of ammonium sulfocyanate until the formation of N-propylamino-ethanol-sulfocyanate | 50 |
| Water | 220 |
| A neutral starch-tragacanth thickener | 550 | the fiber is printed as described in Example 1. In this manner a bright greenish yellow print is obtained whereas without the addition of N-propylaminoethanol-sulfocyanate essentially less strong shades are obtained. The printing paste is stable for some weeks.

Example 5

| | Parts |
|---|---|
| 2-acetoacetylamino-5-methoxy-6-ethoxybenzthiazole | 22.3 |
| The diazoamino compound from diazotized 4-chloro-2-toluidine and the sodium salt of sarcosine | 19.1 |
| Glycol monoethyl ether | 50 |
| Dimethylamino-ethanole | 120 |
| Tartaric acid diethylester | 20 |
| Water | 220 |
| A neutral starch-tragacanth thickener | 550 | are worked up in the normal manner to a printing paste and a tissue is printed therewith as described in Example 1. A bright and strong gold-yellow print is obtained whereas without the addition of tartaric acid diethylester only very slight shades are obtained. The stability of the printing paste is excellent.

Example 6

| | Parts |
|---|---|
| A mixture of 2'-hydroxy-3'-naphthoylamino-2-methoxybenzene and the diazoamino compound from diazotized 4-chloro-2-amino-1-methoxybenezene and the sodium salt of sarcosine | 80 |
| Glycol monoethyl ether | 50 |
| Diethyloxethylamine | 100 |
| Tartaric acid diethylester | 20 |
| Water | 200 |
| A neutral starch-tragacanth thickener | 550 | are made up to a printing paste and according to Example 1 the fiber is printed therewith. In this manner a strong red print is obtained, which is superior as to tinctorial power in comparison with a print made without the addition of tartaric acid diethylester. The stability of the printing paste is excellent.

We claim:

1. A process for producing waterinsoluble azo-dyestuffs on the fiber which consists in adding to printing pastes including thickening agents and solvents such mixtures of coupling components and of diazoamino compounds containing acid watersolubilizing groups in that part of their molecule which does not take part in the dyestuff formation, as allow the splitting off of the diazoamino compound as well as the dyestuff formation in a slightly acid to neutral medium, volatile bases, and salt solutions obtained by neutralizing the aforesaid volatile bases with a substance acting as an acid.

2. Preparations including besides thickening agents and solvents such mixtures of coupling components and of diazoamino compounds containing acid watersolubilizing groups in that part of their molecule which does not take part in the dyestuff formation, as allow the splititng off of the diazoamino compound as well as the dyestuff formation in a slightly acid to neutral medium, volatile bases, and salt solutions obtained by neutralizing the aforesaid volatile bases with a substance acting as an acid.

JOSEF RIEDMAIR.
WALTER PÄSSLER.
GUSTAV TORINUS.